(12) United States Patent
Fan et al.

(10) Patent No.: US 10,878,530 B2
(45) Date of Patent: Dec. 29, 2020

(54) DISPLAY METHOD AND DISPLAY DEVICE

(71) Applicants: Beijing BOE Optoelectronics Technology Co., Ltd., Beijing (CN); BOE TECHNOLOGY GROUP CO., LTD., Beijing (CN)

(72) Inventors: Qingwen Fan, Beijing (CN); Wenyu Li, Beijing (CN); Yukun Sun, Beijing (CN); Jinghua Miao, Beijing (CN); Lixin Wang, Beijing (CN); Bin Zhao, Beijing (CN); Xi Li, Beijing (CN); Jianwen Suo, Beijing (CN); Xuefeng Wang, Beijing (CN); Jinbao Peng, Beijing (CN); Zhifu Li, Beijing (CN); Hao Zhang, Beijing (CN); Lili Chen, Beijing (CN)

(73) Assignees: Beijing BOE Optoelectronics Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/448,740

(22) Filed: Jun. 21, 2019

(65) Prior Publication Data

US 2020/0105050 A1    Apr. 2, 2020

(30) Foreign Application Priority Data

Sep. 28, 2018   (CN) .......................... 2018 1 1142795

(51) Int. Cl.
*G06T 15/20*    (2011.01)
*G06T 3/00*    (2006.01)

(52) U.S. Cl.
CPC .................................. *G06T 3/0093* (2013.01)

(58) Field of Classification Search
CPC ..................................................... G06T 15/205
See application file for complete search history.

(56) References Cited

U.S. PATENT DOCUMENTS

| 2017/0243324 A1* | 8/2017 | Mierle | G06T 3/0093 |
| 2017/0345220 A1* | 11/2017 | Bates | G02B 27/017 |
| 2018/0061121 A1* | 3/2018 | Yeoh | G02B 27/017 |
| 2018/0293786 A1* | 10/2018 | Insko | G06T 15/005 |

* cited by examiner

*Primary Examiner* — Phi Hoang
(74) *Attorney, Agent, or Firm* — Thomas | Horstemeyer LLP (57) ABSTRACT

The present disclosure provides a display method and a display device. The method includes: determining a rendering speed in a scene rendering; deciding whether to start an Asynchronous Time Warp (ATW) thread according to the rendering speed; when deciding not to start the ATW thread in a process of displaying a frame of picture, using a rendering thread to obtain first scene data and, after determining that rendering of the first scene data is completed, executing the rendering thread to modify the first scene data to obtain first modified scene data; and performing a display according to the first modified scene data.

15 Claims, 5 Drawing Sheets

DISPLAY METHOD AND DISPLAY DEVICE

CROSS REFERENCE TO RELATED APPLICATIONS

The present application is based upon and claims priority of Chinese Patent Application No. 201811142795.4, filed on Sep. 28, 2018, the entire disclosure of which being hereby incorporated by reference as a part of the present application.

TECHNICAL FIELD

The present disclosure relates to the field of display technology and, more particularly, to a display method and a display device.

BACKGROUND

VR (Virtual Reality) technology is an emerging field of information technology. It can generate a specific range of virtual environments that are realistic, visual, audible, and tactile. When the user interacts with a VR device, the user can have an immersive feeling and experience as if he or she were actually in the environment.

VR technology requires a VR application to maintain a high frame rate to provide the best rendering quality. Nowadays, Asynchronous Time Warp (ATW) technology has been developed to reduce the dizziness of the user.

It should be noted that the information disclosed in the Background Section above is only for improving understanding of the background of the present disclosure and thus, may include information that does not constitute prior art known to those of ordinary skill in the art.

SUMMARY

The present disclosure provides a display method and a display device.

The present disclosure discloses a display method, and the method includes:

determining a rendering speed in a scene rendering;

deciding whether to start an Asynchronous Time Warp (ATW) thread according to the rendering speed;

when deciding not to start the ATW thread, in a process of displaying a frame of picture, using a rendering thread to obtain first scene data, and after determining that rendering of the first scene data is completed, executing the rendering thread to modify the first scene data to obtain first modified scene data; and performing a display according to the first modified scene data.

Optionally, determining the rendering speed in the scene rendering includes:

during a set time period, producing statistics of a rendering duration for each frame of picture in the scene rendering, and determining an average rendering duration for rendering one frame of picture.

Optionally, deciding whether to start an Asynchronous Time Warp (ATW) thread according to the rendering speed includes:

deciding whether the average rendering duration is longer than a half frame duration, wherein the half frame duration is a duration between a half frame signal and a frame synchronization signal;

when the average rendering duration is not longer than the half frame duration, deciding not to start the ATW thread; and when the average rendering duration is longer than the half-frame duration, deciding to start the ATW thread.

Optionally, in a process of displaying a frame of picture, using a rendering thread to obtain first scene data, and after determining that rendering of the first scene data is completed, executing the rendering thread to modify the first scene data to obtain first modified scene data, includes:

when detecting a first half frame signal, predicting a user posture during a second half frame signal to obtain first posture data, executing the rendering thread to perform scene rendering according to the first posture data to obtain the first scene data;

when determining that rendering of the first scene data is completed, predicting the user posture during the first frame synchronization signal and the second half frame signal to obtain second posture data, executing the rendering thread to determine first modified scene data for a left eye picture according to the first scene data and the second posture data; and predicting the user posture during the second half frame signal and a second frame synchronization signal to obtain third posture data, and executing the rendering thread, to determine first modified scene data for a right eye picture according to the first scene data and the third posture data;

wherein the second half frame signal is one frame duration later than the first half frame signal, the first frame synchronization signal is one half frame duration later than the first half frame signal, and the second frame synchronization signal is one half frame duration later than the second half frame signal;

performing the display according to the first modified scene data that includes:

when the first frame synchronization signal is detected, displaying a left eye picture according to the first modified scene data for the left eye picture; and when the second half frame signal is detected, displaying a right eye picture according to the first modified scene data for the right eye picture.

Optionally, the method further includes:

when deciding to start the ATW thread, in a process of displaying a frame of picture, using the rendering thread to obtain second scene data, and executing the ATW thread to modify the second scene data to obtain second modified scene data; and performing the display according to the second modified scene data.

Optionally, in a process of displaying a frame of picture, using the rendering thread to obtain second scene data, executing the ATW thread to modify the second scene data to obtain second modified scene data includes:

when a third half frame signal is detected, predicting a user posture during a fifth half frame signal to obtain fourth posture data, and executing the rendering thread to perform a scene rendering according to the fourth posture data to obtain the second scene data;

starting the ATW thread when the fourth half frame signal is detected;

predicting a user posture during a fourth frame synchronization signal and the fifth half frame signal to obtain fifth posture data, executing the ATW thread to determine second modified scene data for a left eye picture according to the second scene data and the fifth posture data; and when the fourth frame synchronization signal is detected, predicting a user posture during the fifth half frame signal and the fifth frame synchronization signal to obtain sixth posture data, and executing the ATW thread to determine the second modified scene data for a right eye scene according to the second scene data and the sixth posture data;

wherein the fourth half frame signal is one frame duration later than the third half frame signal, the fifth half frame signal is two frame durations later than the third half frame signal, the fourth frame synchronization signal is one half frame duration later than the third half frame signal, the fifth frame synchronization signal is one half frame duration later than the fourth half frame signal.

Optionally, displaying according to the second modified scene data includes:

when the fourth frame synchronization signal is detected, displaying a left eye picture according to the second modified scene data for the left eye picture; and when the fifth half frame signal is detected, displaying a right eye picture according to the second modified scene data for the right eye picture.

An embodiment of the present disclosure provides a display device, including:

a rendering speed determining module configured to determine a rendering speed in a scene rendering;

a deciding module configured to decide whether to start an Asynchronous Time Warp (ATW) thread according to the rendering speed;

a first rendering and modification module configured to, when it is decided not to start the ATW thread, in a process of displaying a frame of picture, use a rendering thread to obtain first scene data, and after determining that a rendering of the first scene data is completed, execute the rendering thread to modify the first scene data to obtain first modified scene data; and a first display module configured to perform a display according to the first modified scene data.

Optionally, the rendering speed determining module is specifically configured to, during a set time period, produce statistics of a rendering duration for each frame of picture when rendering a scene, and determine an average rendering duration for rendering one frame of picture.

Optionally, the deciding module includes:

a deciding sub-module configured to decide whether the average rendering duration is longer than a half frame duration; wherein the half frame duration is a duration between a half frame signal and a frame synchronization signal;

a first judging sub-module configured to, when the average rendering duration is not longer than the half frame duration, decide not to start the ATW thread; and a second judging sub-module configured to, when the average rendering duration is longer than the half-frame duration, decide to start the ATW thread.

Optionally, the first rendering and modification module includes:

a first scene data obtaining sub-module configured to, when a first half frame signal is detected, predict a user posture during a second half frame signal to obtain first posture data, execute the rendering thread to perform scene rendering according to the first posture data to obtain the first scene data;

a left-eye first modified scene data obtaining sub-module configured to, when it is determined that the rendering of the first scene data is completed, predict the user posture during a first frame synchronization signal and the second half frame signal to obtain second posture data, and the rendering thread being executed to determine first modified scene data for a left eye picture according to the first scene data and the second posture data; and a right-eye first modified scene data obtaining sub-module configured to predict the user posture during the second half frame signal and a second frame synchronization signal to obtain third posture data, the rendering thread being executed to determine the first modified scene data for a right eye picture according to the first scene data and the third posture data;

wherein the second half frame signal is one frame duration later than the first half frame signal, the first frame synchronization signal is one half frame duration later than the first half frame signal, the second frame synchronization signal is one half frame duration later than the second half frame signal;

the first display module includes:

a left-eye picture first display sub-module configured to, when the first frame synchronization signal is detected, display the left eye picture according to the first modified scene data for the left eye picture; and a right-eye picture first display sub-module configured to, when the second half frame signal is detected, display the right eye picture according to the first modified scene data for the right eye picture.

Optionally, the device further includes:

a second rendering and modification module configured to, when it is decided to start the ATW thread, in a process of displaying a frame of picture, use a rendering thread to obtain second scene data, and execute the ATW thread to modify the second scene data to obtain second modified scene data;

a second display module is configured to display according to the second modified scene data.

Optionally, the second rendering and modification module includes:

a second scene data obtaining sub-module configured to, when a third half frame signal is detected, predict a user posture during a fifth half frame signal to obtain fourth posture data, and execute the rendering thread to perform scene rendering according to the fourth posture data to obtain the second scene data;

an ATW thread starting sub-module configured to start the ATW thread when the fourth half frame signal is detected;

a left-eye second modified scene data obtaining sub-module configured to predict the user posture during a fourth frame synchronization signal and the fifth half frame signal to obtain fifth posture data, and execute the ATW thread to determine the second modified scene data for a left eye picture according to the second scene data and the fifth posture data; and a right-eye second modified scene data obtaining sub-module configured to, when the fourth frame synchronization signal is detected, predict the user posture during the fifth half frame signal and a fifth frame synchronization signal to obtain sixth posture data, and execute the ATW thread to determine the second modified scene data for a right eye scene according to the second scene data and the sixth posture data.

wherein the fourth half frame signal is one frame duration later than the third half frame signal, the fifth half frame signal is two frame durations later than the third half frame signal, the fourth frame synchronization signal is one half frame duration later than the third half frame signal, and the fifth frame synchronization signal is one half frame duration later than the fourth half frame signal.

Optionally, the second display module includes:

a left-eye picture second display sub-module configured to, when the fourth frame synchronization signal is detected, display the left eye picture according to the second modified scene data for the left eye picture; and a right-eye picture second display sub-module configured to, when the fifth half frame signal is detected, display the right eye picture according to the second modified scene data for the right eye picture.

An embodiment of the present disclosure provides a display device including a processor, a memory, and a computer program stored on the processor and executable by the processor, the computer program being executed by the processor to implement steps of the display method as described above.

An embodiment of the present disclosure provides a non-transitory computer-readable storage medium storing a computer program thereon, the computer program being executable by a processor to implement the steps of the display method as described above.

It should be noted that the information disclosed in the Background Section above is only for improving understanding of the background of the present disclosure and thus, may include information that does not constitute prior art known to those of ordinary skill in the art.

DETAILED DESCRIPTION

The above objectives, features, and advantages of the present disclosure will become more apparent, and the present disclosure will be further described in detail with reference to the accompanying drawings and specific embodiments.

First Embodiment

Figure 1:
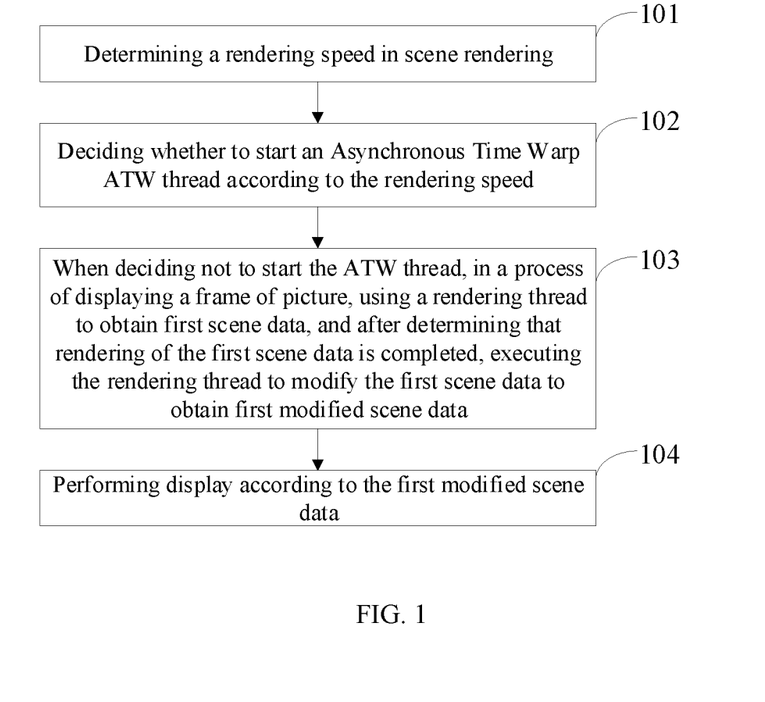
FIG. 1 is a flow chart showing steps of a display method according to a first embodiment of the present disclosure.

Referring to FIG. 1, a flow chart showing steps of a display method is shown according to a first embodiment of the present disclosure, the method includes the following steps.

In step 101, a rendering speed in scene rendering is determined.

In the embodiment, the rendering speed at which a rendering thread performs scene rendering may vary depending on the performance of the processor and the complexity of the VR application scenario. For example, when the application scenario is relatively complicated, the rendering thread may perform scene rendering at a slow speed; and when the application scenario is relatively simple, the rendering thread may perform scene rendering at a fast speed. As can be seen, the rendering duration of a scene may be used to represent the rendering speed of the scene. Determining a rendering speed in scene rendering specifically includes: in a preset time period, producing statistics of a rendering duration for each frame of picture in scene rendering and determining an average rendering duration for rendering one frame of picture. For example, 100 frames of pictures are rendered and rendering durations t1, t2, t3, . . . , t100 for the frames of pictures in the scene rendering are added up, and the average rendering duration T required for rendering one frame of the picture is calculated. The embodiment of the present disclosure does not limit the preset time period in detail, and the preset time period can be determined according to actual situation. The average rendering duration T represents the rendering speed in scene rendering. The scene rendering is performed to color the scene, and process the light in the scene and the material of the object into a form of the screen. The scene data may include texture, illumination, shadow, color, and so on. A thread, also known as a Lightweight Process (LWP), is the smallest unit in a program execution flow. The thread can create and withdraw the thread, thereby realizing concurrent execution of programs.

In step 102, it is decided whether to start an Asynchronous Time Warp (ATW) thread according to the rendering speed.

In the embodiment, if the rendering speed is relatively slow when performing scene rendering, the ATW thread needs to be started to prevent the screen from jittering and causing a user to feel dizzy. But if the rendering speed is relatively fast, the ATW thread need not be started. Such method breaks through the conventional method of executing the ATW thread and the rendering thread in parallel and takes both performance of various processors and the complexity of the VR application scenarios into consideration. Deciding whether to start an Asynchronous Time Warp (ATW) thread may specifically include the following steps.

In Sub-step one, it is decided whether the average rendering duration is longer than a half frame duration, wherein the half frame duration is a duration between a half frame signal and a frame synchronization signal.

In Sub-step two, when the average rendering duration is no longer than the half frame duration, it is decided not to start the ATW thread.

Figure 2:
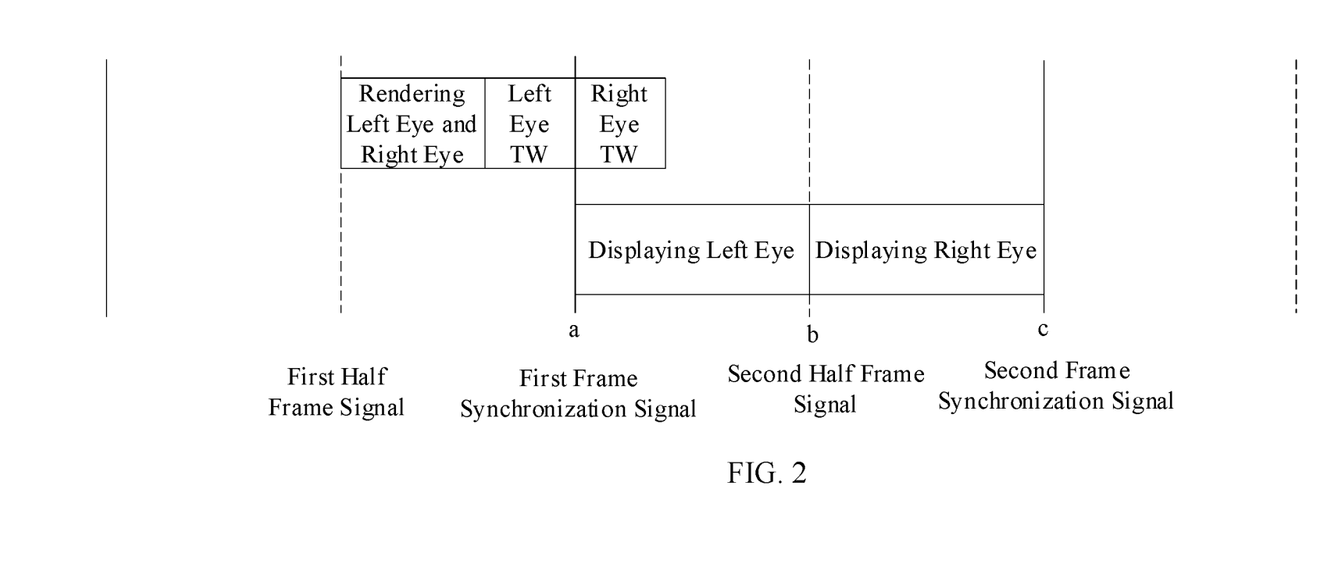
FIG. 2 shows a first display progress chart according to the first embodiment of the present disclosure.

Specifically, if the average rendering duration T is no longer than the half frame duration, the display progress may refer to FIG. 2. In this case, it means that the processor performance is excellent or the VR application scenario is relatively simple, so the rending and modification can be completed in the same frame without starting the ATW thread. Therefore, it is decided not to start the ATW thread.

In Sub-step three, when the average rendering duration is longer than the half-frame duration, it is decided to start the ATW thread.

Figure 3:
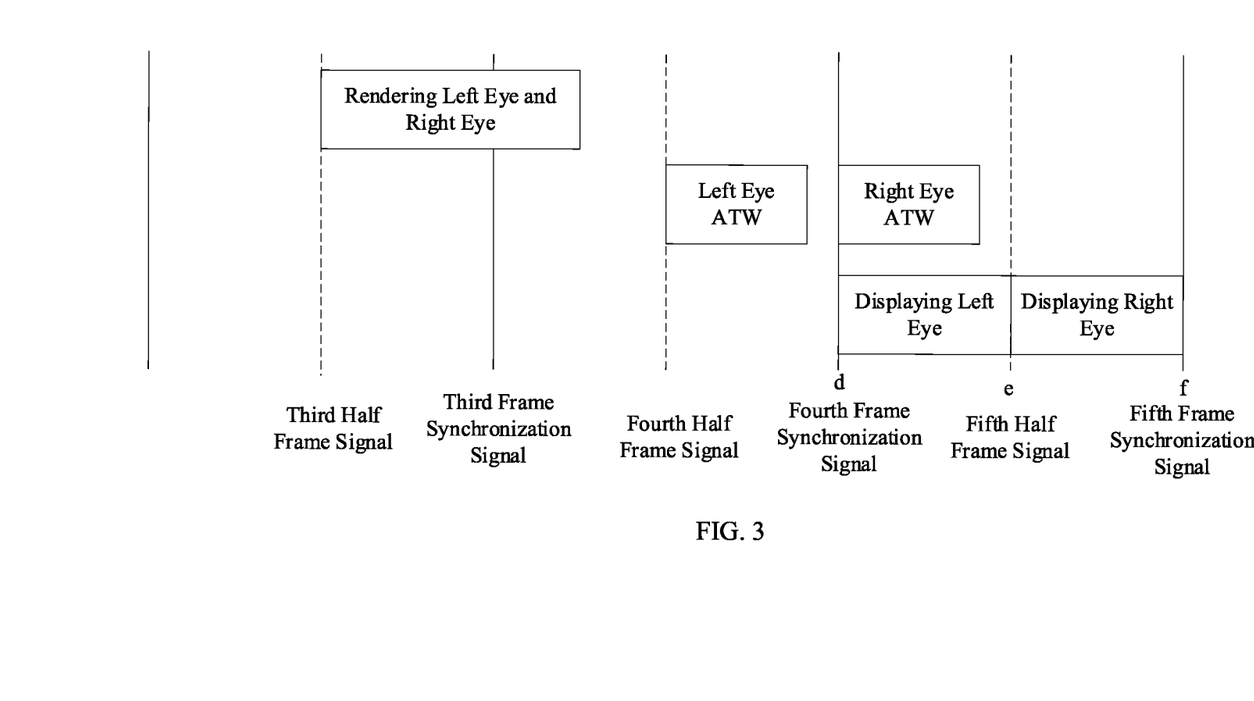
FIG. 3 shows a second display progress chart according to the first embodiment of the present disclosure.

Specifically, if the average rendering duration T is longer than the half frame duration, the display progress may refer to FIG. 3. In this case, it means that the processor performance is poor or the VR application scenario is relatively complex, so the rending and modification cannot be completed in the same frame without starting the ATW thread. In order to improve the smoothness of the pictures in the display, it is decided to start the ATW thread.

According to the relationship between the average rendering duration T and the half frame duration, it can be decided whether to start the ATW thread, and it can take both of the performance of various processors and the complexity of the VR application scenarios into consideration. Moreover, not starting the ATW thread can also reduce system power consumption.

In step 103, when it is decided not to start the ATW thread, in a process of displaying a frame of picture, the rendering thread is used to obtain first scene data and, after determining that rendering of the first scene data is completed, the rendering thread is executed to modify the first scene data to obtain first modified scene data.

In the embodiment, when it is decided not to start the ATW thread, the rendering thread is used to perform the scene rendering to obtain the first scene data. When the rendering is completed, the rendering thread is used to modify the first scene data to obtain the first modified scene data. Specifically, the method may include the following steps.

In Sub-step one, when a first half frame signal is detected, a user posture during a second half frame signal is predicted to obtain first posture data, the rendering thread is executed to perform the scene rendering according to the first posture data to obtain the first scene data.

Specifically, as shown in FIG. 2, when the first half frame signal is detected, the user posture during the second half frame signal is predicted, wherein the second half frame signal is one frame duration later than the first half frame signal, the first posture data is obtained by prediction. For example, it is predicted that a user's head at a point "b" will turn 30° to the right to obtain the first posture data, after the user's head is turned 30° to the right. The posture data may include at least one of an Euler angle and acceleration. This is not limited in the embodiment of the present disclosure and may be determined according to actual situation. Then, the rendering thread is executed, and the rendering thread performs the scene rendering according to the first posture data to obtain the first scene data.

In Sub-step two, when it is determined that the rendering of the first scene data is completed, the user posture during the first frame synchronization signal and the second half frame signal are predicted to obtain second posture data, and the rendering thread is executed to determine the first modified scene data for a left eye picture according to the first scene data and the second posture data.

For example, as shown in FIG. 2, the first frame synchronization signal is one half frame duration later than the first half frame signal. The user posture at a point "a" of the first frame synchronization signal and the point "b" of the second half frame signal is predicted. The user posture at a point "a" of the first frame synchronization signal and the point "b" of the second half frame signal is interpolated to obtain the second posture data. The rendering thread is executed, and the first scene data is modified, according to the second posture data, to determine first modified scene data for a left eye picture.

In Sub-step three, the user posture during the second half frame signal and second frame synchronization signal is predicted to obtain third posture data, the rendering thread is executed, to determine first modified scene data for a right eye picture according to the first scene data and the third posture data.

For example, as shown in FIG. 2, the second frame synchronization signal is one half frame duration later than the second half frame signal. The user posture at the point "b" of the second half frame signal and at the point "c" of the second frame synchronization signal is predicted, and the user posture at the point "b" of the second half frame signal and at the point "c" of the second frame synchronization signal is interpolated to obtain third posture data. The first scene data is modified according to the third posture data, to determine first modified scene data for a right eye picture.

In step 104, a display is performed according to the first modified scene data.

In this embodiment, when the first frame synchronization signal is detected, the left eye picture is displayed according to the first modified scene data for the left eye picture, and, when the second half frame signal is detected, the right eye picture is displayed according to the first modified scene data for the right eye picture, as shown in FIG. 2. It can be seen that, when the ATW thread is not started, since the rendering thread is used to perform the scene rendering and the scene data is modified, display can be performed one frame duration after the scene rendering. While when the ATW thread is started, as shown in FIG. 3, the display can be performed two frame durations after the scene rendering. Therefore, the embodiment of the present disclosure shortens the time from rendering a picture to displaying the picture.

Accordingly, in the embodiment of the present disclosure, a rendering speed in scene rendering is determined, it is decided whether to start an Asynchronous Time Warp (ATW) thread according to the rendering speed. When it is decided not to start the ATW thread in a process of displaying a frame of picture, the rendering thread is used to obtain first scene data and, after determining that rendering of the first scene data is completed, a rendering thread is executed to modify the first scene data to obtain first modified scene data; and a display is performed according to the first modified scene data. Through the embodiment of the present disclosure, both of the performance of various processors and the complexity of the VR application scenarios are taken into consideration. When the ATW thread is not started, since the rendering thread is performed for rendering and modification, it can not only reduce the picture jittering, reduce the dizziness of the user, but also can reduce system power consumption, reduce latency between the scene rendering and display, and improve the user experience.

Second Embodiment

Figure 4:
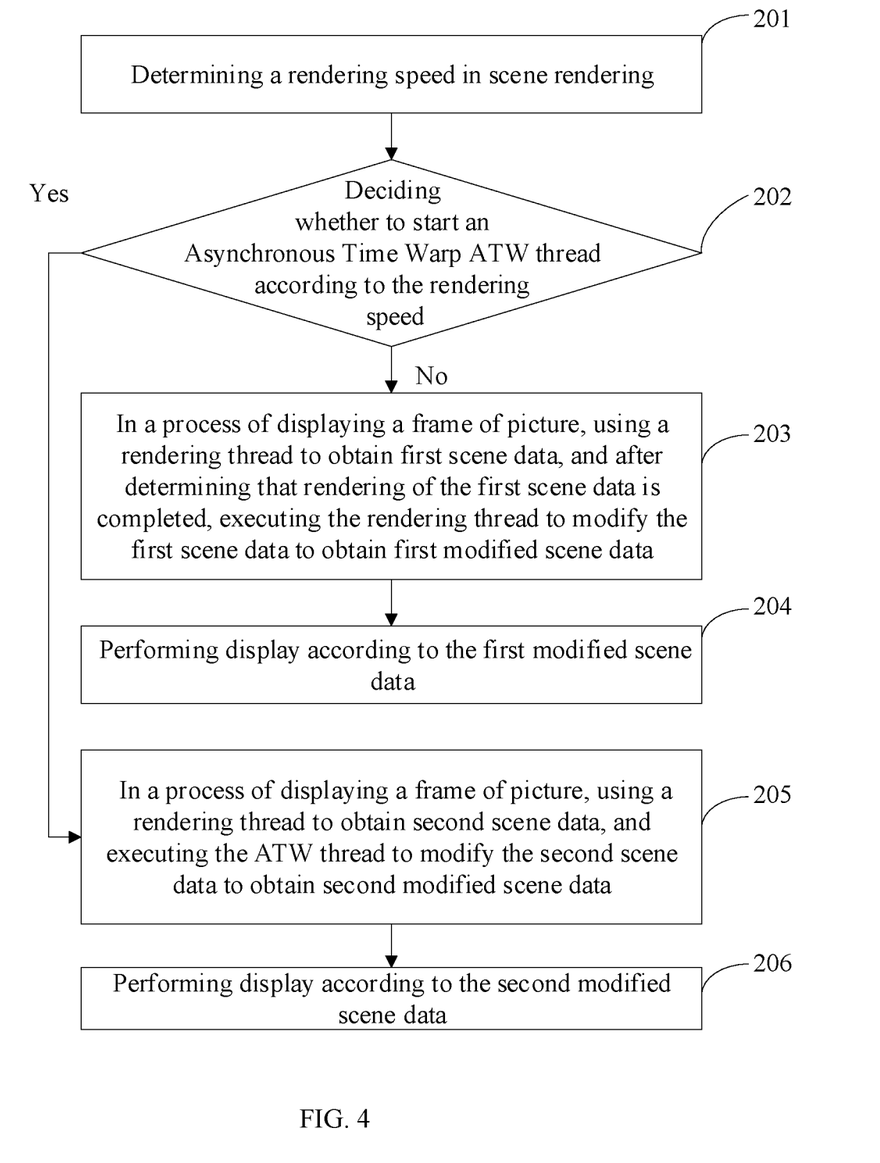
FIG. 4 is a flow chart showing steps of a display method according to a second embodiment of the present disclosure.

Referring to FIG. 4, which is a flow chart showing steps of a display method according to a second embodiment of the present disclosure, the method includes the following steps.

In step 201, a rendering speed in scene rendering is determined.

In step 202, it is decided whether to start an Asynchronous Time Warp (ATW) thread according to the rendering speed.

In step 203, when it is decided not to start the ATW thread, in a process of displaying a frame of picture, the rendering thread is used to obtain first scene data. After determining that rendering of the first scene data is completed, the rendering thread is executed to modify the first scene data to obtain first modified scene data.

In step 204, a display is performed according to the first modified scene data.

In step 205, when it is decided to start the ATW thread, in a process of displaying a frame of picture, the rendering thread is used to obtain second scene data, and the ATW thread is executed to modify the second scene data to obtain second modified scene data.

In this embodiment, the rendering thread is used to perform the scene rendering to obtain the second scene data, and then, the ATW thread is executed to modify the second scene data to obtain the second modified scene data. Specifically, the method may include the following steps.

In Sub-step one, when a third half frame signal is detected, a user posture during a fifth half frame signal is predicted to obtain fourth posture data, the rendering thread is executed, to perform the scene rendering according to the fourth posture data to obtain the second scene data.

For example, as shown in FIG. 3, two frame durations after the third half frame signal is the fifth half frame signal. The user posture at a point "e" of the fifth half frame signal is predicted to obtain the fourth posture data. Then, the rendering thread is executed to perform the scene rendering according to the fourth posture data to obtain the second scene data.

In Sub-step two, the ATW thread is started when the fourth half frame signal is detected.

For example, as shown in FIG. 3, the fourth half frame signal is one frame duration later than the third half frame signal. The ATW thread is started at a point "d" of the fourth half frame signal.

In Sub-step three, a user posture during a fourth frame synchronization signal and the fifth half frame signal is predicted to obtain fifth posture data, and the ATW thread is executed to determine the second modified scene data for a left eye picture according to the second scene data and the fifth posture data.

For example, as shown in FIG. 3, the fourth frame synchronization signal is one half frame duration later than the third half frame signal. The user posture at a point "d" of the fourth frame synchronization signal and the point "e" of the fifth half frame signal is predicted. The user posture at a point "d" of the fourth frame synchronization signal and the point "e" of the fifth half frame signal is interpolated to obtain the fifth posture data. The ATW thread is executed, and the second scene data is modified according to the fifth posture data to determine the second modified scene data for the left eye picture.

In Sub-step four, when the fourth frame synchronization signal is detected, the user posture during the fifth half frame signal and the fifth frame synchronization signal is predicted to obtain sixth posture data, and the ATW thread is executed to determine the second modified scene data for a right eye scene according to the second scene data and the sixth posture data.

For example, as shown in FIG. 3, the fifth frame synchronization signal is one half frame duration later than the fifth half frame signal. The user posture at a point "e" of the fifth half frame signal and a point "f" of the fifth frame synchronization signal is predicted and interpolated to obtain the sixth posture data. The ATW thread is executed, and the second scene data is modified according to the sixth posture data to determine the second modified scene data for the right eye picture.

In step 206, a display is performed according to the second modified scene data.

In this embodiment, after the second modified scene data is obtained, the display is performed according to the second modified scene data. Specifically, when the fourth frame synchronization signal is detected, the left eye picture is displayed according to the second modified scene data for the left eye picture, and, when the fifth half frame signal is detected, the right eye picture is displayed according to the second modified scene data for the right eye picture, as shown in FIG. 3. It can be seen that the modification processing of the monocular picture can be performed during a half frame time, and the monocular picture is displayed when the next frame synchronization signal is detected. Compared to modifying a binocular picture before displaying the binocular picture, it can improve the display speed.

Accordingly, in the embodiment of the present disclosure, a rendering speed in scene rendering is determined, it is decided whether to start an Asynchronous Time Warp (ATW) thread according to the rendering speed; when it is decided not to start the ATW thread, in a process of displaying a frame of picture, the rendering thread is used to obtain first scene data, and after determining that rendering of the first scene data is completed, the rendering thread is executed to modify the first scene data to obtain first modified scene data; and a display is performed according to the first modified scene data. Through the embodiment of the present disclosure, both of the performance of various processors and the complexity of the VR application scenarios are taken into consideration. When the ATW thread is not started, since the rendering thread is performed for rendering and modification, it can not only reduce the picture jittering, reduce the dizziness of the user, but also can reduce system power consumption, reduce latency between the scene rendering and display, and improve the user experience.

Third Embodiment

Figure 5:
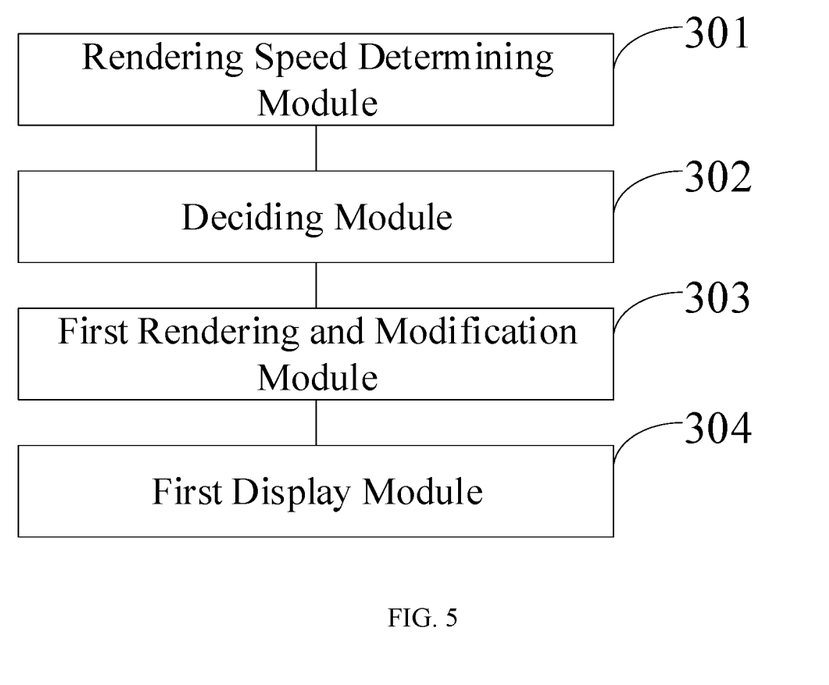
FIG. 5 is a block diagram showing a structure of a display device according to a third embodiment of the present disclosure.

Referring to FIG. 5, which a block diagram showing a structure of a display device according to a third embodiment of the present disclosure, the device includes:

a rendering speed determining module 301 configured to determine a rendering speed in a scene rendering;

a deciding module 302 configured to decide whether to start an Asynchronous Time Warp (ATW) thread according to the rendering speed;

a first rendering and modification module 303 configured to, when it is decided not to start the ATW thread in a process of displaying a frame of picture, use the rendering thread to obtain first scene data and, after determining that rendering of the first scene data is completed, execute the rendering thread to modify the first scene data to obtain first modified scene data; and a first display module 304 configured to perform a display according to the first modified scene data.

According to an exemplary embodiment of the present disclosure, the rendering speed determination module, the deciding module, the first rendering and modification module, and the first display module may be implemented by various circuits known in the art or developed in the future. For example, to determine the rendering speed of a scene rendering, the rendering speed determination module may include dedicated/generalized circuitry configured to perform sampling, signal extraction, data temporary storage and/or computation, and other related operations. Circuits that perform the above operations have been developed and widely used in the art and will not be described again. In a similar manner, the deciding module, the first rendering and modification module, the first display module, and other modules/sub-modules discussed further below may be constructed in a similar manner.

In addition, the present disclosure is not limited to the above implementations. For example, the rendering speed determination module, the deciding module, the first rendering and modification module, and the first display module may be implemented by computer readable instructions. For example, to determine the rendering speed of the scene rendering, the rendering speed determination module can include a set of computer readable instructions that, when executed in the processor, cause the processor itself or in conjunction with other external hardware to perform sampling, signal extraction, data temporary storage and/or computation, and other related operations. Computer readable instructions that enable a computer to perform the above operations have been developed and widely used in the art and will not be described again. In a similar manner, the deciding module, the first rendering and modification module, the first display module, and other modules/sub-modules discussed further below may be constructed in a similar manner.

Those skilled in the art will appreciate that the modules/sub-modules of the present disclosure may also be implemented by a combination of the above-described circuits and/or computer readable instructions.

Optionally, the rendering speed determining module 301 is specifically configured to, during a set time period, produce statistics of a rendering duration for each frame of picture in a scene rendering, and determine an average rendering duration for rendering one frame of picture.

Optionally, the deciding module 302 includes:

a deciding sub-module configured to decide whether the average rendering duration is longer than a half frame duration, where the half frame duration is a duration between a half frame signal and a frame synchronization signal;

a first judging sub-module configured to, when the average rendering duration is not longer than the half frame duration, decide not to start the ATW thread; and a second judging sub-module configured to, when the average rendering duration is longer than the half-frame duration, decide to start the ATW thread.

Optionally, the first rendering and modification module 303 includes:

a first scene data obtaining sub-module configured to, when a first half frame signal is detected, predict a user posture during a second half frame signal to obtain first posture data, execute the rendering thread to perform a scene rendering according to the first posture data to obtain the first scene data;

a left-eye first modified scene data obtaining sub-module configured to, when it is determined that a rendering of the first scene data is completed, predict the user posture during a first frame synchronization signal and the second half frame signal to obtain second posture data, and the rendering thread is executed, to determine first modified scene data for a left eye picture according to the first scene data and the second posture data; and a right-eye first modified scene data obtaining sub-module configured to predict the user posture during the second half frame signal and a second frame synchronization signal to obtain third posture data, the rendering thread is executed, to determine the first modified scene data for a right eye picture according to the first scene data and the third posture data.

The second half frame signal is one frame duration later than the first half frame signal. The first frame synchronization signal is one half frame duration later than the first half frame signal. The second frame synchronization signal is one half frame duration later than the second half frame signal The first display module includes:

a left-eye picture first display sub-module configured to, when the first frame synchronization signal is detected, display the left eye picture according to the first modified scene data for the left eye picture; and a right-eye picture first display sub-module configured to, when the second half frame signal is detected, display the right eye picture according to the first modified scene data for the right eye picture.

Optionally, the device also includes:

a second rendering and modification module configured to, when it is decided to start the ATW thread in a process of displaying a frame of picture, use the rendering thread to obtain second scene data, and execute the ATW thread to modify the second scene data to obtain second modified scene data;

a second display module is configured to display according to the second modified scene data.

Optionally, the second rendering and modification module includes:

a second scene data obtaining sub-module configured to, when a third half frame signal is detected, predict the user posture during a fifth half frame signal to obtain fourth posture data, and execute the rendering thread, to perform the scene rendering according to the fourth posture data to obtain the second scene data;

an ATW thread starting sub-module configured to start the ATW thread when the fourth half frame signal is detected;

a left-eye second modified scene data obtaining sub-module configured to predict the user posture during a fourth frame synchronization signal and the fifth half frame signal to obtain fifth posture data and execute the ATW thread to determine the second modified scene data for a left eye picture according to the second scene data and the fifth posture data; and a right-eye second modified scene data obtaining sub-module configured to, when the fourth frame synchronization signal is detected, predict the user posture during the fifth half frame signal and the fifth frame synchronization signal to obtain sixth posture data, and execute the ATW thread to determine the second modified scene data for a right eye scene according to the second scene data and the sixth posture data.

The fourth half frame signal is one frame duration later than the third half frame signal. The fifth half frame signal is two frame durations later than the third half frame signal. The fourth frame synchronization signal is one half frame duration later than the third half frame signal. The fifth frame synchronization signal is one half frame duration later than the fourth half frame signal.

Optionally, the second display module includes:

a left-eye picture second display sub-module configured to, when the fourth frame synchronization signal is detected, display the left eye picture according to the second modified scene data for the left eye picture; and a right-eye picture second display sub-module configured to, when the fifth half frame signal is detected, display the right eye picture according to the second modified scene data for the right eye picture.

Accordingly, in the embodiment of the present disclosure, a rendering speed in scene rendering is determined. It is decided whether to start an Asynchronous Time Warp (ATW) thread according to the rendering speed. When it is decided not to start the ATW thread, in a process of displaying a frame of picture, the rendering thread is used to obtain first scene data. After determining that rendering of the first scene data is completed, the rendering thread is executed to modify the first scene data to obtain first modified scene data, and a display is performed according to the first modified scene data. Through the embodiment of the present disclosure, both of the performance of various processors and the complexity of the VR application scenarios are taken into consideration. When the ATW thread is not started, since the rendering thread is performed for rendering and modification, it can not only reduce the picture jittering, reduce the dizziness of the user, but also can reduce system power consumption, reduce latency between scene rendering and display, and improve the user experience.

An embodiment of the present disclosure also provides a display device including a processor, a memory, and a computer program stored on the memory and executable on the processor. The computer program is executed by the processor to implement the steps of the display method as described above.

An embodiment of the present disclosure further provides a computer readable storage medium, where the computer readable storage medium stores a computer program. The computer program is executed by the processor to implement the steps of the display method as described above.

Compared with the related art, the present disclosure has the following advantages:

a rendering speed in a scene rendering is determined, it is decided whether to start an Asynchronous Time Warp (ATW) thread according to the rendering speed; when it is decided not to start the ATW thread, in a process of displaying a frame of picture, the rendering thread is used to obtain first scene data, and after determining that rendering of the first scene data is completed, the rendering thread is executed to modify the first scene data to obtain first modified scene data; and a display is performed according to the first modified scene data. Through the embodiment of the present disclosure, both of the performance of various processors and the complexity of the VR application scenarios are taken into consideration. When the ATW thread is not started, since the rendering thread is performed for rendering and modification, it can not only reduce the picture jittering, reduce the dizziness of the user, but also can reduce system power consumption, reduce latency between scene rendering and display, and improve the user experience.

The various embodiments in the present specification are described in a progressive manner, and each embodiment focuses on differences from other embodiments, and the same similar parts between the various embodiments can be referred to each other.

Finally, it should also be noted that in this context, relational terms such as first and second are used merely to distinguish one entity or operation from another entity or operation and do not necessarily require or imply that there is any such actual relationship or order between these entities or operations. Furthermore, the terms "comprising" or "including" or any other variations are intended to encompass a non-exclusive inclusion, such that processes, methods, articles, or devices that include a set of elements and include not only those elements but also include other elements not explicitly listed, or elements inherent to such processes, methods, articles, or devices. An element defined by the phrase "comprising a . . . " without further limitation does not exclude the existence of additional identical elements in the process, method, article, or device that includes the element.

The display method and the display device provided by the present disclosure are described in detail above. The principles and implementations of the present disclosure have been described with specific examples. The description of the above implementations is only for understanding the method of the present disclosure and its core ideas. Those skilled in the art will be able to change the embodiments and the scope of the application according to the idea of the present disclosure based on the idea of the present disclosure. Accordingly, the content of the specification should not be construed as limiting the present disclosure.

What is claimed is:

1. A display method, comprising:
   determining a rendering speed in scene rendering, wherein determining the rendering speed in the scene rendering comprises, during a set time period, determining an average rendering duration for rendering one frame of picture according to a rendering duration for each frame of picture in the scene rendering;
   deciding whether to start an Asynchronous Time Warp (ATW) thread according to the rendering speed, wherein deciding whether to start the ATW thread according to the rendering speed comprises:
      deciding whether the average rendering duration is longer than a half frame duration, wherein the half frame duration is a duration between a half frame signal and a frame synchronization signal;
      when the average rendering duration is not longer than the half frame duration, deciding not to start the ATW thread; and
      when the average rendering duration is longer than the half-frame duration, deciding to start the ATW thread;
   when deciding not to start the ATW thread in a process of displaying a frame of picture, using a rendering thread to obtain first scene data and, after determining that a rendering of the first scene data is completed, executing the rendering thread to modify the first scene data to obtain first modified scene data; and
   performing a display according to the first modified scene data.

2. The display method according to claim 1, wherein, in the process of displaying the frame of picture using the rendering thread to obtain the first scene data and, after determining that the rendering of the first scene data is completed, executing the rendering thread to modify the first scene data to obtain the first modified scene data, comprises:
   when detecting a first half frame signal, predicting a user posture during a second half frame signal to obtain first posture data, and executing the rendering thread to perform the scene rendering according to the first posture data to obtain the first scene data;
   when determining that rendering of the first scene data is completed, predicting the user posture during a first frame synchronization signal and the second half frame signal to obtain second posture data, and executing the rendering thread to determine first modified scene data for a left eye picture according to the first scene data and the second posture data; and
   predicting the user posture during the second half frame signal and a second frame synchronization signal to obtain third posture data, and executing the rendering thread, to determine the first modified scene data for a right eye picture according to the first scene data and the third posture data;
   wherein the second half frame signal is a one frame duration later than the first half frame signal, the first frame synchronization signal is a one half frame duration later than the first half frame signal, the second frame synchronization signal is one half frame duration later than the second half frame signal;
   wherein performing the display according to the first modified scene data comprises:
      when the first frame synchronization signal is detected, displaying the left eye picture according to the first modified scene data for the left eye picture; and when the second half frame signal is detected, displaying the right eye picture according to the first modified scene data for the right eye picture.

3. The display method according to claim 1, further comprising:
when deciding to start the ATW thread, in the process of displaying the frame of picture, using the rendering thread to obtain second scene data, executing the ATW thread to modify the second scene data to obtain second modified scene data; and
performing the display according to the second modified scene data.

4. The display method according to claim 3, wherein, in the process of displaying a frame of picture, using the rendering thread to obtain the second scene data, and executing the ATW thread to modify the second scene data to obtain the second modified scene data comprises:
when a third half frame signal is detected, predicting a user posture during a fifth half frame signal to obtain fourth posture data, and executing the rendering thread to perform a scene rendering according to the fourth posture data to obtain the second scene data;
starting the ATW thread when a fourth half frame signal is detected;
predicting the user posture during a fourth frame synchronization signal and the fifth half frame signal to obtain fifth posture data, and executing the ATW thread to determine the second modified scene data for a left eye picture according to the second scene data and the fifth posture data; and
when the fourth frame synchronization signal is detected, predicting the user posture during the fifth half frame signal and the fifth frame synchronization signal to obtain sixth posture data, and executing the ATW thread to determine the second modified scene data for a right eye scene according to the second scene data and the sixth posture data;
wherein the fourth half frame signal is one frame duration later than the third half frame signal, the fifth half frame signal is two frame durations later than the third half frame signal, the fourth frame synchronization signal is a one half frame duration later than the third half frame signal, the fifth frame synchronization signal is one half frame duration later than the fourth half frame signal.

5. The display method according to claim 4, wherein displaying according to the second modified scene data comprises:
when the fourth frame synchronization signal is detected, displaying a left eye picture according to the second modified scene data for the left eye picture; and
when the fifth half frame signal is detected, displaying a right eye picture according to the second modified scene data for the right eye picture.

6. A display device, comprising:
a rendering speed determining module configured to determine a rendering speed in scene rendering, wherein the rendering speed determining module is configured to, during a set time period, determine an average rendering duration for rendering one frame of picture according to a rendering duration for each frame of picture when rendering a scene;
a deciding module configured to decide whether to start an Asynchronous Time Warp (ATW) thread according to the rendering speed, wherein the deciding module comprises:
a deciding sub-module configured to decide whether the average rendering duration is longer than a half frame duration, wherein the half frame duration is a duration between a half frame signal and a frame synchronization signal;
a first judging sub-module configured to, when the average rendering duration is no longer than the half frame duration, decide not to start the ATW thread; and
a second judging sub-module configured to, when the average rendering duration is longer than the half-frame duration, decide to start the ATW thread;
a first rendering and modification module configured to, when it is decided not to start the ATW thread in a process of displaying a frame of picture, use a rendering thread to obtain first scene data, and after determining that a rendering of the first scene data is completed, execute the rendering thread to modify the first scene data to obtain first modified scene data; and
a first display module configured to perform a display according to the first modified scene data.

7. The display device according to claim 6, wherein the first rendering and modification module comprises:
the first scene data obtaining sub-module configured to, when a first half frame signal is detected, predict a user posture during a second half frame signal to obtain first posture data, and execute the rendering thread to perform scene rendering according to the first posture data to obtain the first scene data;
a left-eye first modified scene data obtaining sub-module configured to, when it is determined that rendering of the first scene data is completed, predict the user posture during a first frame synchronization signal and the second half frame signal to obtain second posture data, wherein the rendering thread is executed to determine first modified scene data for a left eye picture according to the first scene data and second posture data; and
a right-eye first modified scene data obtaining sub-module configured to predict the user posture during the second half frame signal and a second frame synchronization signal to obtain third posture data, wherein rendering thread is executed, to determine the first modified scene data for a right eye picture according to the first scene data and the third posture data;
wherein the second half frame signal is a one frame duration later than the first half frame signal, the first frame synchronization signal is one half frame duration later than the first half frame signal, and the second frame synchronization signal is one half frame duration later than the second half frame signal;
wherein the first display module comprises:
a left-eye picture first display sub-module configured to, when the first frame synchronization signal is detected, display the left eye picture according to the first modified scene data for the left eye picture; and
a right-eye picture first display sub-module configured to, when the second half frame signal is detected, display the right eye picture according to the first modified scene data for the right eye picture.

8. The display device according to claim 6, further comprising:
a second rendering and modification module configured to, when it is decided to start the ATW thread in a process of displaying the frame of picture, use the rendering thread to obtain second scene data and execute the ATW thread to modify the second scene data to obtain second modified scene data; and a second display module configured to display according to the second modified scene data.

9. The display device according to claim 8, wherein the second rendering and modification module comprises:
the second scene data obtaining sub-module configured to, when a third half frame signal is detected, predict a user posture during a fifth half frame signal to obtain fourth posture data, and execute the rendering thread to perform the scene rendering according to the fourth posture data to obtain the second scene data, the ATW thread starting the sub-module and being configured to start the ATW thread when a fourth half frame signal is detected;
a left-eye second modified scene data obtaining sub-module configured to predict the user posture during a fourth frame synchronization signal and the fifth half frame signal to obtain fifth posture data, and execute the ATW thread to determine the second modified scene data for a left eye picture according to the second scene data and the fifth posture data; and
a right-eye second modified scene data obtaining sub-module configured to, when the fourth frame synchronization signal is detected, predict the user posture during the fifth half frame signal and a fifth frame synchronization signal to obtain sixth posture data, and execute the ATW thread to determine the second modified scene data for a right eye scene according to the second scene data and the sixth posture data;
wherein the fourth half frame signal is a one frame duration later than the third half frame signal, the fifth half frame signal is two frame durations later than the third half frame signal, the fourth frame synchronization signal is one half frame duration later than the third half frame signal, and the fifth frame synchronization signal is one half frame duration later than the fourth half frame signal.

10. The display device according to claim 9, wherein the second display module comprises:
a left-eye picture second display sub-module configured to, when the fourth frame synchronization signal is detected, display the left eye picture according to the second modified scene data for the left eye picture; and
a right-eye picture second display sub-module configured to, when the fifth half frame signal is detected, display the right eye picture according to the second modified scene data for the right eye picture.

11. A display device, comprising:
at least one hardware processor, a memory, and a computer program stored on the memory and executable by the at least one hardware processor, the computer program being executed by the at least one hardware processor to cause the at least one hardware processor to perform a method comprising:
determining a rendering speed in a scene rendering, wherein determining the rendering speed in the scene rendering comprises, during a set time period, determining an average rendering duration for rendering one frame of picture according to a rendering duration for each frame of picture in the scene rendering;
deciding whether to start an Asynchronous Time Warp (ATW) thread according to the rendering speed, wherein deciding whether to start the ATW thread according to the rendering speed comprises:
deciding whether the average rendering duration is longer than a half frame duration; wherein the half frame duration is a duration between a half frame signal and a frame synchronization signal;
when the average rendering duration is not longer than the half frame duration, deciding not to start the ATW thread; and
when the average rendering duration is longer than the half-frame duration, deciding to start the ATW thread;
when deciding not to start the ATW thread, in a process of displaying a frame of picture, using a rendering thread to obtain first scene data and, after determining that a rendering of the first scene data is completed, executing the rendering thread to modify the first scene data to obtain first modified scene data; and
performing a display according to the first modified scene data.

12. The display device according to claim 11, wherein in the process of displaying the frame of picture, using the rendering thread to obtain the first scene data, and after determining that the rendering of the first scene data is completed, executing the rendering thread to modify the first scene data to obtain the first modified scene data, comprises:
when detecting a first half frame signal, predicting a user posture during a second half frame signal to obtain first posture data, and executing the rendering thread to perform the scene rendering according to the first posture data to obtain the first scene data;
when determining that the rendering of the first scene data is completed, predicting the user posture during a first frame synchronization signal and the second half frame signal to obtain second posture data, and executing the rendering thread to determine the first modified scene data for a left eye picture according to the first scene data and the second posture data; and
predicting the user posture during the second half frame signal and a second frame synchronization signal to obtain third posture data, and executing the rendering thread to determine the first modified scene data for a right eye picture according to the first scene data and the third posture data;
wherein the second half frame signal is a one frame duration later than the first half frame signal, the first frame synchronization signal is one half frame duration later than the first half frame signal, the second frame synchronization signal is a one half frame duration later than the second half frame signal;
wherein performing the display according to the first modified scene data comprises:
when the first frame synchronization signal is detected, displaying the left eye picture according to the first modified scene data for the left eye picture; and
when the second half frame signal is detected, displaying the right eye picture according to the first modified scene data for the right eye picture.

13. The display device according to claim 11, wherein the method further comprises:
when deciding to start the ATW thread in the process of displaying the frame of picture, using the rendering thread to obtain second scene data, and executing the ATW thread to modify the second scene data to obtain second modified scene data; and
performing the display according to the second modified scene data.

14. The display device according to claim 13, wherein, in the process of displaying the frame of picture, using the rendering thread to obtain the second scene data, and executing the ATW thread to modify the second scene data to obtain the second modified scene data comprises:

when a third half frame signal is detected, predicting a user posture during a fifth half frame signal to obtain fourth posture data, and executing the rendering thread to perform the scene rendering according to the fourth posture data to obtain the second scene data;

starting the ATW thread when a fourth half frame signal is detected;

predicting a user posture during a fourth frame synchronization signal and the fifth half frame signal to obtain fifth posture data, and executing the ATW thread to determine the second modified scene data for a left eye picture according to the second scene data and the fifth posture data; and when the fourth frame synchronization signal is detected, predicting the user posture during the fifth half frame signal and a fifth frame synchronization signal to obtain sixth posture data, and executing the ATW thread to determine the second modified scene data for a right eye scene according to the second scene data and the sixth posture data;

wherein the fourth half frame signal is a one frame duration later than the third half frame signal, the fifth half frame signal is two frame durations later than the third half frame signal, the fourth frame synchronization signal is one half frame duration later than the third half frame signal, the fifth frame synchronization signal is one half frame duration later than the fourth half frame signal.

15. The display device according to claim 14, wherein displaying according to the second modified scene data comprises:

when the fourth frame synchronization signal is detected, displaying the left eye picture according to the second modified scene data for the left eye picture; and when the fifth half frame signal is detected, displaying the right eye picture according to the second modified scene data for the right eye picture.

* * * * *